United States Patent

Catheron

[15] 3,680,376

[45] Aug. 1, 1972

[54] LOW NOISE PRIMARY DEVICE FOR FLUID FLOW MEASUREMENT BY HEAD METER (SIGNAL NOISE)

[72] Inventor: Allan R. Catheron, Concord, Mass.

[73] Assignee: The Foxboro Company, Foxboro, Mass.

[22] Filed: July 30, 1970

[21] Appl. No.: 59,615

[52] U.S. Cl..................................73/211, 73/213
[51] Int. Cl..............................G01f 1/00, G01p 5/14
[58] Field of Search................................73/211, 213

[56] References Cited

UNITED STATES PATENTS

| | | | |
|---|---|---|---|
| 2,614,423 | 10/1952 | Carbone | 73/211 |
| 2,942,465 | 6/1960 | Carbone | 73/211 |
| 3,410,138 | 11/1968 | Lynch | 73/211 |
| 1,559,155 | 10/1925 | Bullock | 73/211 |
| 2,872,810 | 2/1959 | Shaffer | 73/213 |
| 1,140,661 | 5/1915 | Brodie | 73/213 |
| 2,752,949 | 7/1956 | Jones | 137/784 |
| 1,850,030 | 3/1932 | Pardoe | 73/213 |
| 1,105,581 | 7/1914 | Rusby | 73/197 |

FOREIGN PATENTS OR APPLICATIONS

| | | | |
|---|---|---|---|
| 313,214 | 6/1929 | Great Britain | 73/213 |

*Primary Examiner*—Richard C. Queisser
*Assistant Examiner*—Herbert Goldstein
*Attorney*—Lawrence H. Poeton

[57] ABSTRACT

Structure for use in a differential pressure sensor system for relatively noise-free measurement of fluid flow. A streamlined nozzle device usable in a pipe line as an element of, and compatible with accepted forms of, flow measurement sensor systems. Such a nozzle form readily insertable in an existing flow measurement sensor system to reduce noise by substituting a streamlined nozzle form for an existing downstream turbulence creating form such as an orifice plate. A flow measurement device in nozzle from with the throat of the nozzle form pressure tapped to a channel in the outer periphery of the nozzle form throat, this channel essentially closable by the inner wall of the pipe line to provide a pressure chamber which may be in the nature of a piezometer ring communicating with the downstream pressure tap of a flow sensor system compatible with accepted practice. A flow sensor nozzle differential pressure system with up and downstream pipe line pressure taps, the latter communicating with pressure taps in the throat of the nozzle, and a piezometer ring about the nozzle throat and defined in part by the inner wall of the pipe line at the downstream tap.

1 Claim, 10 Drawing Figures

INVENTOR.
ALLAN R. CATHERON

AGENT

PATENTED AUG 1 1972 3,680,376

INVENTOR.
ALLAN R. CATHERON

INVENTOR.
ALLAN R. CATHERON

AGENT

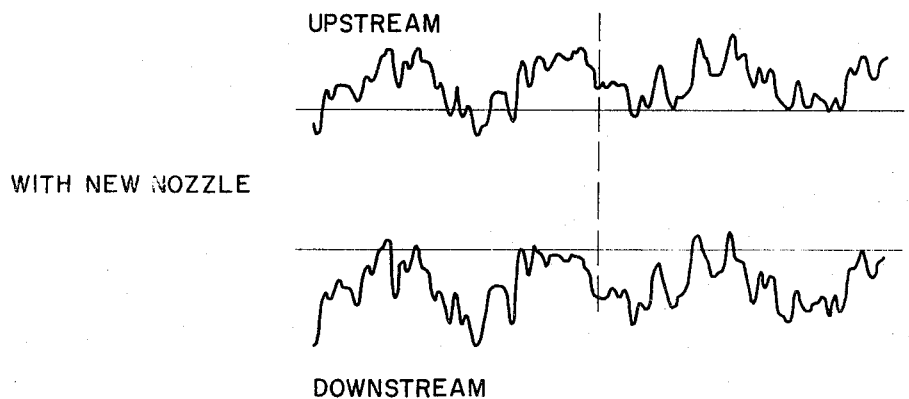
WITH NEW NOZZLE
FIG. 8
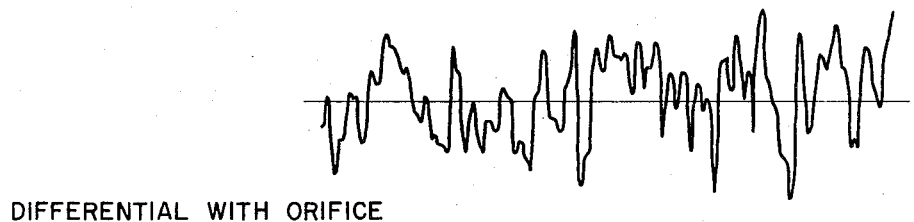
DIFFERENTIAL WITH ORIFICE
FIG. 9
DIFFERENTIAL WITH NEW NOZZLE
FIG. 10

LOW NOISE PRIMARY DEVICE FOR FLUID FLOW MEASUREMENT BY HEAD METER (SIGNAL NOISE)

FIELD OF INVENTION

This invention relates to fluid flow measurement by head meter, and more particularly relates to primary devices for such flow measurement.

This invention provides quiet measurement of fluid flow with a nozzle element substitutable for an orifice plate element in a simple structure.

In the measurement of flow, "noise," unrelated to the true measurement of flow, causes error in the measurement signal. This invention eliminates such noise in a manner compatible with existing accepted practices, by simple substitution of elements.

It has been observed and confirmed that the apparently random pressure noise includes certain dominant frequencies that are independent of flow rate.

This invention does not require the establishment of a new set of measurement coefficients, and existing accuracies are maintained. As a replacement for an orifice plate with its considerable noise problem, this invention fits in the same pipe line flanges, operates with the same pipe line taps, and thus permits the use of existing differential pressure cell devices and connections. Damping is avoided. True and false flow differential signals are separated in a frequency range limited only by the associated instrumentation.

In the case of the pressures observed at the upstream and downstream taps of an orifice plate, the downstream pressure pattern is an amplification and distortion of the upstream pressure pattern if simultaneously recorded with closely coupled transducers capable of high frequency response.

This means that the differential pressure has superimposed on it a noise characteristic that frequently closely resembles that of the downstream pressure, particularly if the upstream noise amplitude is relatively small.

Removal of the orifice plate has no appreciable effect on the upstream tap noise form or amplitude, but the downstream pattern then duplicates the upstream with no visible phase shift. The differential noise becomes negligible. This suggests that the orifice itself is not the primary source of the noise. Instead, the noise comes from turbulence elsewhere in the system; both boundary layer turbulence at the pipe walls and turbulence from valves, elbows, and discontinuities of any sort. Mechanical devices such as centrifugal pumps also make a contribution, of course, but usually in a frequency range above the present problem level. The absence of perceptible phase differences between the records indicates that these turbulences cause pressure waves travelling at sound wave velocities in the line. No evidence was found that appreciable effects come from transmission through the pipe wall material. Since flowing velocities are so much lower than sonic (usually below 10 or 15 ft/sec for liquids), the pressure noise may reach the taps from sources either upstream or downstream. Experiments made with partly closed valves as noise sources in either direction confirm this.

These observations point out the need for a primary device that can minimize if not eliminate the distortion and amplification of the noise pattern at the downstream tap.

BACKGROUND

Noise in flow measurement is the fluctuation of the differential signal from a head meter device at frequencies usually above 1 Hz. It is frequently a cause of difficulty in recording and control. Among other things, it causes chart painting and unnecessary valve activity. Serious problems of accuracy may be induced, particularly when dealing with sampled data.

In the past, simple damping of either the measurement itself or of transmitted signals has been used to reduce noise effects. If the time response of the damping is slow enough, all traces of the noise disappear, but the overlap of the noise frequencies with the normal frequency capability of measurement devices means that the damping often degrades the dynamic operating potential of a measurement system. This invention reduces the noise disturbance without damping the measurement. The noise is a pressure fluctuation not directly related to flow. This is unlike the effect of a pulsating flow, which is useful data even if at inconvenient frequencies. The pressure noise patterns at the two taps of an orifice flange are essentially alike if there is no orifice plate mounted, but with the plate in place, the downstream tap shows an amplified and distorted version of the upstream pattern. The difference comes through as noise in the differential pressure that is basic to any flow measurement by head meter.

This invention provides a primary device that minimizes the difference between the pressure patterns at the two taps, mounts interchangeably with an orifice plate in unmodified orifice flanges, thus leaving the cell mountings unchanged, and conforms to existing calibration coefficients and accuracies so as not to require the establishment of a new set of standards.

Reductions in noise amplitude by factors of 3 to 5 are possible, over a considerable range of $d/D$ ratios. The location of a noise source and the amplitude of the noise do not alter the effectiveness of the device.

The noise problem is an old one, becoming very obtrusive with the introduction of the dry differential transmitter to replace the naturally damped mercury meter. Simple accommodation with the problem was acceptable until recently, when today's need for more accurate flow measurements coupled with the increased use of differential pressure data in sampled form requires a new approach.

The difference between noise and the effects of flow pulsation is of importance here. Noise, in this context, is the pressure fluctuation appearing at the individual pressure taps of a head meter and resulting from turbulence anywhere in the line, upstream or downstream. These noise fluctuations are pressure waves transmitted at sonic velocity in the flowing fluid. It appears that such noise is present in all head meter taps to a greater or lesser degree depending upon the individual system, and the part of it appearing in the differential measurement does not represent useful flow rate information.

Pulsation appears in the differential pressure reading of a head meter as the result of rapid fluctuations in the rate of flow such as might be caused by a reciprocating pump or some oscillatory disturbance of the flow itself. Thus, it represents actual flow rate information, although it may be changing at rates beyond the response capability of the associated measurement and control equipment. Noise and such pulsation appear to represent two separate and distinct problems. This invention concerns itself with the noise problem.

There are several reasons for wishing to eliminate or at least minimize the differential measurement noise. In recording, it causes "painting" of the chart, which makes accurate reading and integration much more difficult. In a control loop, it promotes undesirable valve activity to the extent that control adjustments are sometimes degraded to reduce the effect, and it is possible that elements in the loop may saturate with resulting transfer errors. More recently felt is the difficulty experienced when data with superimposed noise is sampled for direct digital computer control, since both random apparent errors and non-existent cycles may appear to confuse the operation. If the square root of the signal is to be taken by any means, noise reduction is an advantage.

In operation, this structure effects a major improvement in the noise level of the differential, and records of the up- and downstream pressures showed that this had been achieved by the intended technique of better matching the downstream pressure noise pattern to the upstream with respect to both amplitude and phase.

In the standard nozzle, the downstream pressure is sensed in the considerable diametral clearance between the nozzle body and the pipe wall, connecting the pressure tap to the downstream end of the nozzle. In the device of this invention, the downstream end of the nozzle extends diametrically to at least a point just less than the pipe bore size. The clearance is made ample to pass normal bore variation without interference.

The effect of $d/D$ ratio indicates that if the differential for a given flow rate in a pipe line is increased by decreasing the $d/D$ of the head device, the noise amplitude increases but not in proportion to the increase in differential. This occurs presumably because so much of the noise is generated elsewhere in the system where conditions remain unchanged. With any head device the noise amplitude expressed as a percentage of differential is lower with lower $d/D$ ratios.

Nozzles of this invention provide considerable improvement in the noise amplitude with both high and low $d/D$'s, compared to corresponding orifice plates. To define a factor of improvement, the amplitude with an orifice is divided by the amplitude using the nozzle under the same conditions. The amplitudes may be expressed as either direct inches of water or percentages of the full scale or instant differential.

Whatever the various design parameters and combinations of parameters, it is necessary to provide, for a particular application, a nozzle which is streamlined and contoured to maintain boundary layer effect without separation which is capable of significant effect of the pressures at the pressure taps.

It is known that an orifice plate situation has turbulence in the area of the downstream pressure tap. It is known that in this situation, noise differential between upstream and downstream taps is undesirably large.

In this invention a streamlined flow nozzle is used, with attention to parameters which minimize the possibility of separation. The noise differential between upstream and downstream taps is minimized in the situation of this invention, with nozzle throat taps connected to a piezometer ring within the pipe line.

It is therefore, an object of this invention to provide a quiet nozzle for flow measurement, which is compatible with existing measurement situations, is substitutable for an orifice plate in a like situation, without other structural change.

Other objects and advantages of this invention will be in part apparent and in part pointed out here hereinafter and in the accompanying drawings, wherein:

FIGS. 6 through 10 are various noise pressure patterns at pipe line installation pressure taps, as indicated.

Figure 1:
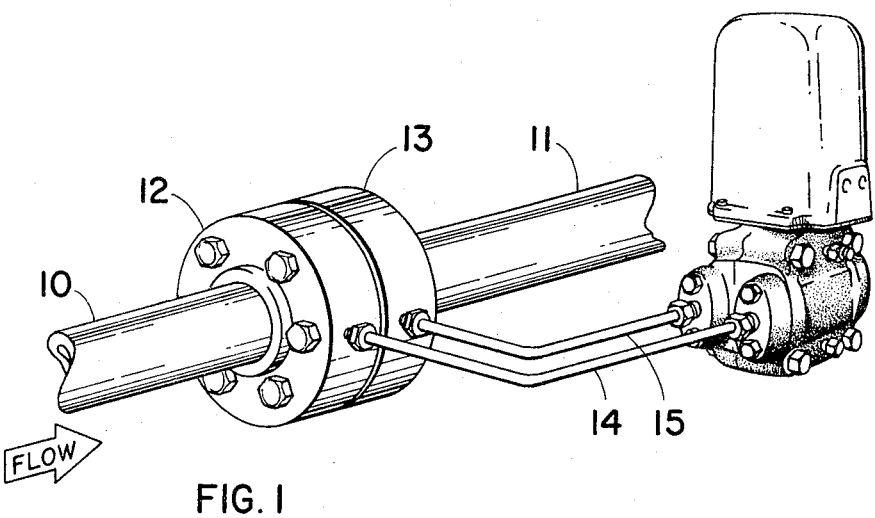
FIG. 1 is a perspective of a flow measurement installation as used with this invention.

The installation of FIG. 1 comprises an upstream pipe 10, a downstream pipe 11, connection flanges 12 and 13, pressure tap lines 14 and 15, in the upstream flange 12 and the downstream flange 13, and a differential pressure cell transmitter to which the pressure tap lines 14 and 15 extend. The nozzle of this invention is not visible in FIG. 1, but is mounted in the pipe line between the pipe connector flanges 12 and 13.

Figure 2:
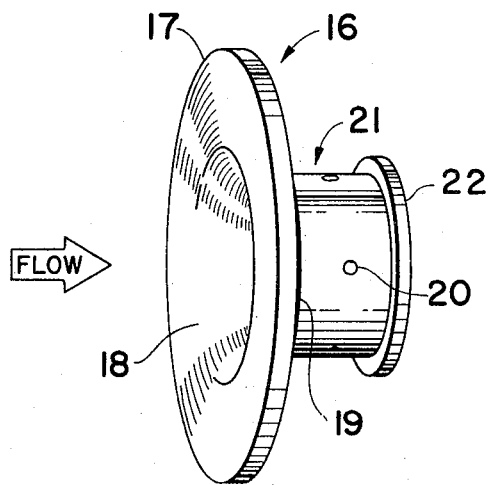
FIG. 2 is an overall perspective of a flow measurement nozzle according to this invention.
Figure 3:
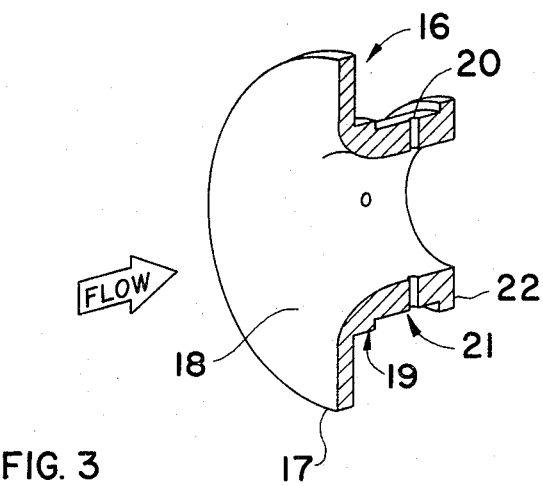
FIG. 3 is a vertical central section through the flow nozzle of FIG. 2.

The nozzle 16 of FIGS. 2, and 3, comprises an annular flange 17, a nozzle entrance curve form 18, and a throat body 19. The flow passage through the throat body 19 is cylindrical and straight through as shown. In any case in regard to the flow and measurement parameters of a particular application, the inner contour of the nozzle must be formed to avoid undesirable boundary layer wall separation.

Figure 4:
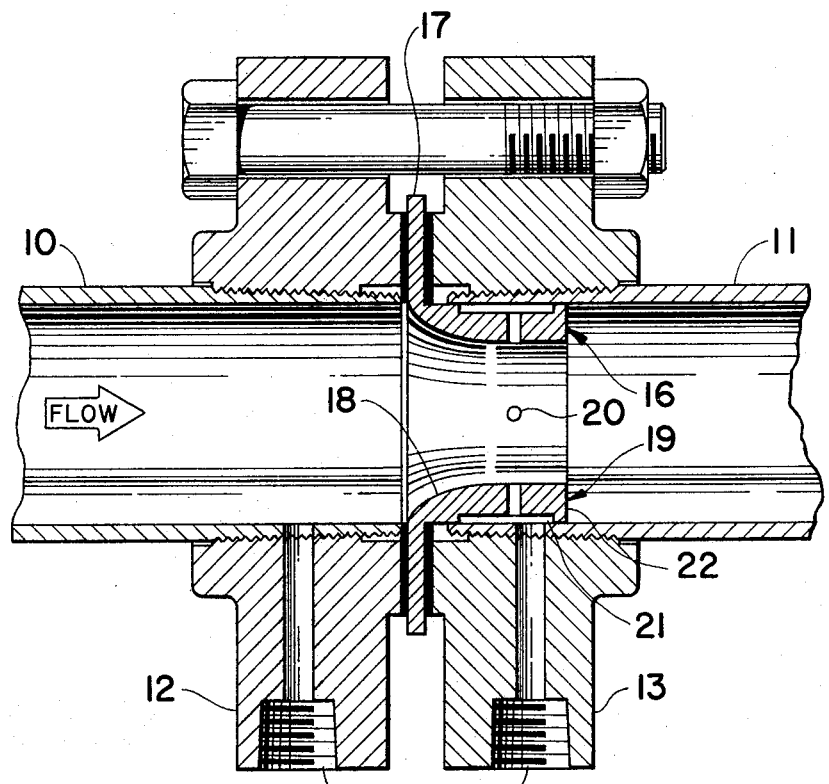
FIG. 4 is a vertical central section of the flow nozzle of FIG. 2 installed in a pipe line.

Further, in FIGS. 2, 3, and 4, the outer periphery of the nozzle throat body 19 is provided with an annular, radially outwardly facing channel 21, into which the throat taps 20 extend from inside the nozzle, in the throat passage. The throat taps 20 are in a single plane, or at least, all connected to the channel 21, and spaced about the periphery of the nozzle throat body 19. The number of such taps depends on particular applications. It is desirable to have small tap holes, but size is limited in this direction by clogging possibilities. As a general rule, it is preferable that the sum of the throat tap opening areas at least equal the area of the downstream pipe tap.

Still further, in FIGS. 2, 3, and 4, the downstream of the nozzle throat body 19 is provided with an annular flange 22, which in this case is defined by the formation of the channel 21. For ease of assembly, the flange 22 may be a loose fit in the downstream pipe 11, since pressure effects in the channel 21 are negligible from downstream changes applied through the small clearance between the periphery of the flange 22 and the inner wall of the downstream pipe 11. The entrance curve 18 of the nozzle, the length of the nozzle throat, the relation of the nozzle throat diameter to that of the pipe line inner diameter, and other like parameters are matters of particular combinations for particular applications. In a device of this nature, it is desirable that an essentially unseparated boundary layer be maintained in the nozzle throat passage.

Such throat tap pressure considerations provide the necessary effect for this invention, when combined with the channel 21 within the downstream pipe for immediacy of location and averaging response to pressure variations in the throat taps 20. As a substitute for an orifice plate, the nozzle of this invention has the use of established pipe flanges and taps as in FIG. 1, particularly since, FIG. 4, the downstream pipe tap 15 is taken at a point to which the channel 21 is matched. The flange 17 of the nozzle equates to the outer periphery of an orifice plate. Thus it is simple to substitute the nozzle of this invention for an orifice plate in an existing flow measurement situation as established under accepted practice. In any case, a piezometer ring is formed by using the inner wall of the downstream pipe 11 as a closure for the channel 21.

In Figure, the nozzle 16 is shown within the pipe line, suitably gasketed as between the pipe flanges 12 and 13.

Figure 5:
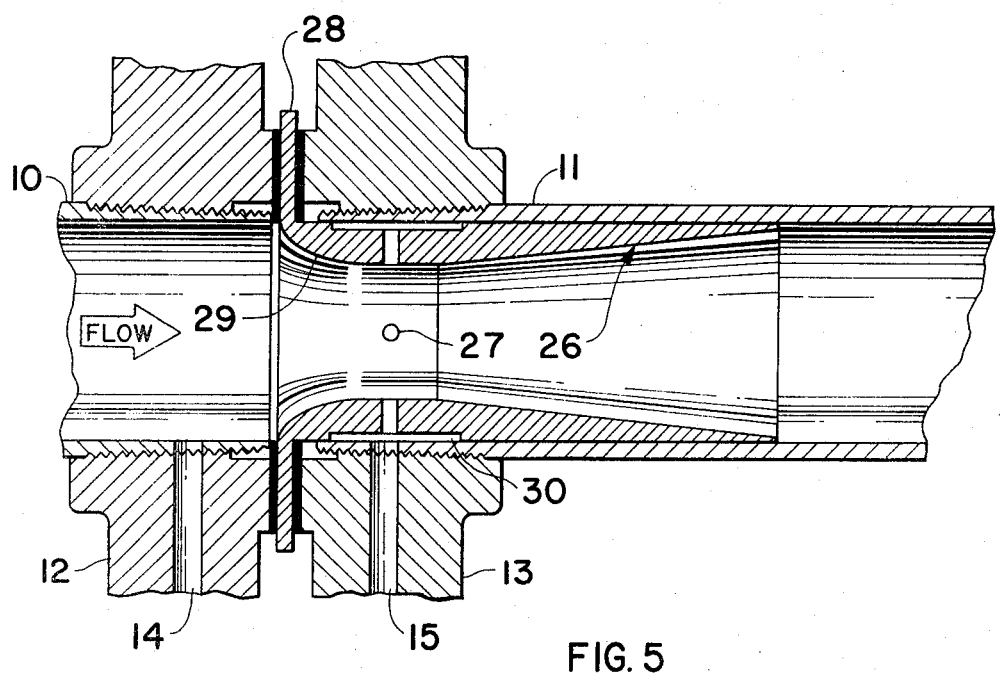
FIG. 5 is an alternate structure according to this invention, in vertical central section and installed in a pipe line.

The structure of FIG. 5 illustrates an alternate device in which the structure is extended downstream of the throat taps 27 in gradually expanding flare. This is of the order of 10° of included angle, or less. In this structure a mounting flange 28 leads into the entrance curve 29, and the channel 30 is open to the downstream pipe pressure tap 15. Optional O-rings are shown up- and downstream with respect to the channel and this channel is made into a piezometer ring by the closure effect of the inner wall of the downstream pipe 11.

The effect of use of the device of this invention is essentially the removal of the noise factor from the flow induced differential pressure. This is accomplished by permitting transmission by the downstream tap 15 of a noise pattern essentially duplicating that in the upstream tap 14. These noise patterns are balanced against each other in the differential cell transmitter, and are thus, for practical purposes, cancelled out.

FIGS. 6 through 10 illustrate the need for such cancellation, and the effect of using the device of this invention. These pressure patterns duplicate actual test runs.

Figure 6:
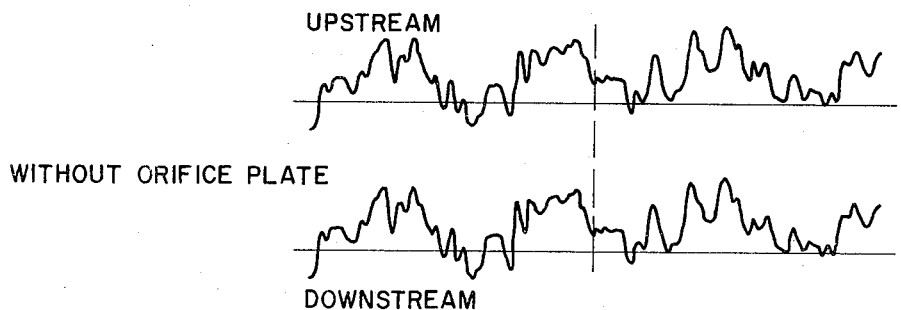

FIG. 6 illustrates the effect observed when no orifice plate, nozzle, or other head meter device is used. It is shown that the noise pressure pattern is here the same at both taps 14 and 15.

Figure 7:
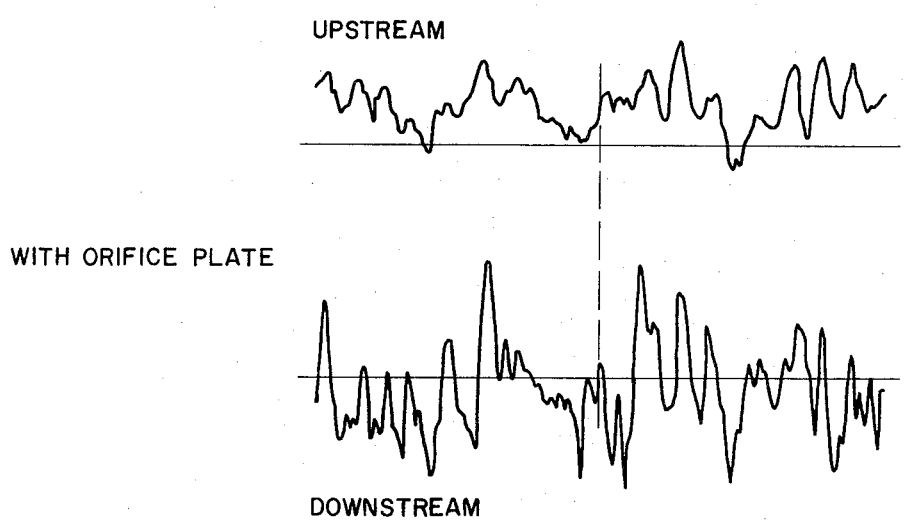

In FIG. 7, the problem corrected by this invention appears. With an orifice plate in the pipe line, the downstream noise pressure pattern is significantly distorted, mostly in amplitude.

In FIG. 8, use of the nozzle of the invention causes the distortions of FIG. 7 to essentially disappear, and the up- and downstream pressure patterns are closely matched.

FIGS. 9 and 10 shown the striking change in the noise differential. FIG. 9 is the difference of the FIG. 7 patterns, and FIG. 10 is the almost zero difference of the patterns of FIG. 8. Thus FIG. 8 represents cancellation of noise by use of this invention, so that pressure differences that are applied to the differential cell transmitter are true representations of flow in the pipe line.

This invention, therefore, provides a new and useful flow measurement primary element, in nozzle form, with special considerations of substitutability, and simplicity.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

I claim:

1. A low noise flow measurement device comprising:
an upstream pipe end and a downstream pipe end in end to end alignment;
a pressure tap hole through the wall of said upstream pipe end;
a pressure tap hole through the wall of said downstream pipe end;
said upstream and downstream pressure tap holes being located for suitable flow measurement use with an orifice plate when such plate is located between said pipe ends;
a flow nozzle in said downstream pipe;
said flow nozzle having a peripheral mounting flange on its upstream end in a plane between said pipe ends, in likeness to the mounting flange and assembly of an orifice plate between such pipe ends;
said flow nozzle having an outer peripheral channel which, with the adjacent inner wall of said downstream pipe end, forms a piezometer ring about said downstream pipe end at a location which includes the location of said pressure tap hole in said downstream pipe, whereby said downstream pressure tap hole and said peizometer ring are connected;
a group of peripherally spaced throat taps in said flow nozzle, all of which connect the interior of said flow nozzle with said piezometer ring and therefore with said downstream pressure tap hole;
an upstream coupling flange mounted on said upstream pipe end;
a pressure tap passage through said upstream coupling flange and connected to the interior of said upstream pipe end through said upstream pressure tap hole;
a downstream coupling flange mounted on said downstream pipe end;
a pressure tap passage through said downstream coupling flange and connected to the interior of said flow nozzle through said downstream pipe end pressure tap hole, said piezometer ring, and said flow nozzle throat taps; and
means for securing said coupling flanges together, with said flow nozzle flange held between said coupling flanges.

* * * * *